(12) United States Patent
Ding et al.

(10) Patent No.: US 8,988,811 B1
(45) Date of Patent: Mar. 24, 2015

(54) DISK DRIVE TOGGLING VCM INDUCTOR COMPENSATION TO REDUCE ACOUSTIC NOISE

(75) Inventors: Jianghong Ding, Lake Forest, CA (US); Duc T. Phan, Saratoga, CA (US); Robert P. Ryan, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 487 days.

(21) Appl. No.: 12/126,377

(22) Filed: May 23, 2008

(51) Int. Cl.
*G11B 5/55* (2006.01)

(52) U.S. Cl.
CPC .................................... *G11B 5/5534* (2013.01)
USPC ......................... 360/55; 360/78.09; 360/78.04

(58) Field of Classification Search
None
See application file for complete search history.

(56) References Cited

U.S. PATENT DOCUMENTS

| | | | |
|---|---|---|---|
| 5,654,840 A * | 8/1997 | Patton et al. ..................... | 360/75 |
| 5,696,647 A | 12/1997 | Phan et al. | |
| 5,751,513 A | 5/1998 | Phan et al. | |
| 5,768,045 A | 6/1998 | Patton, III et al. | |
| 5,936,788 A | 8/1999 | Boutaghou et al. | |
| 6,025,968 A | 2/2000 | Albrecht | |
| 6,097,564 A | 8/2000 | Hunter | |
| 6,148,240 A | 11/2000 | Wang et al. | |
| 6,256,163 B1 | 7/2001 | Schmidt et al. | |
| 6,316,898 B1 | 11/2001 | Albrecht et al. | |
| 6,396,652 B1 | 5/2002 | Kawachi et al. ................. | 360/75 |
| 6,560,057 B1 * | 5/2003 | Klaassen et al. ................. | 360/75 |
| 6,690,536 B1 | 2/2004 | Ryan ........................... | 360/78.04 |
| 6,717,765 B2 | 4/2004 | Harmer ............................ | 360/75 |
| 6,795,268 B1 | 9/2004 | Ryan ............................ | 360/78.04 |
| 6,826,007 B1 | 11/2004 | Patton, III ......................... | 360/75 |
| 6,900,959 B1 * | 5/2005 | Gardner et al. .................. | 360/75 |
| 6,937,429 B2 | 8/2005 | Yoshida et al. | |
| 6,950,271 B2 * | 9/2005 | Inaji et al. .................. | 360/78.04 |
| 6,950,272 B1 | 9/2005 | Rice et al. | |
| 6,950,274 B2 * | 9/2005 | Inaji et al. .................. | 360/78.14 |
| 6,954,324 B1 | 10/2005 | Tu et al. | |
| 6,982,848 B2 * | 1/2006 | Inaji et al. ........................ | 360/75 |
| 7,042,673 B2 * | 5/2006 | Jeong .............................. | 360/75 |
| 7,054,098 B1 | 5/2006 | Yu et al. | |
| 7,064,919 B2 * | 6/2006 | Inaji et al. .................. | 360/78.06 |
| 7,072,135 B2 | 7/2006 | Suzuki | |
| 7,082,010 B1 | 7/2006 | Hansen et al. | |
| 7,095,579 B1 | 8/2006 | Ryan et al. | |
| 7,110,207 B2 | 9/2006 | Hirano et al. | |
| 7,224,546 B1 | 5/2007 | Orakcilar et al. | |
| 7,477,471 B1 * | 1/2009 | Nemshick et al. .............. | 360/75 |
| 7,576,939 B2 * | 8/2009 | Ooi et al. ......................... | 360/75 |
| 2001/0019463 A1 | 9/2001 | Drouin | |
| 2003/0161065 A1 | 8/2003 | Yatsu | |
| 2005/0007688 A1 | 1/2005 | Chang et al. | |
| 2007/0285828 A1 | 12/2007 | Yamashita et al. | |

* cited by examiner

*Primary Examiner* — Wayne Young
*Assistant Examiner* — James L Habermehl (57) ABSTRACT

A disk drive is disclosed comprising a disk, and a voice coil motor (VCM) operable to rotate an actuator arm about a pivot to actuate a head radially over the disk. A voice coil voltage is measured across the voice coil, a velocity command of the VCM is set to substantially zero, an inductor compensation circuit is toggled at least once by enabling and disabling the inductor compensation circuit, the inductor compensation circuit is enabled, the velocity command of the VCM is adjusted, and a control signal is generated and applied to the voice coil in order to move the actuator arm, wherein the control signal is generated in response to the adjusted velocity command, the voice coil voltage, and the estimated inductance voltage.

25 Claims, 8 Drawing Sheets

DISK DRIVE TOGGLING VCM INDUCTOR COMPENSATION TO REDUCE ACOUSTIC NOISE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

There are times when the servo control system does not have access to the embedded servo sectors yet it is still desirable to control the velocity of the actuator arm. For example, in disk drives employing ramp loading/unloading, it is desirable to control the velocity of the actuator arm so that the head is not damaged as it travels off the ramp onto the disk as well as off the disk onto the ramp. Another example is if the servo control system loses servo sector synchronization it is desirable to control the velocity of the actuator arm to facilitate re-synchronizing to the servo sectors.

Prior art techniques for controlling the velocity of the actuator arm when servo sector information is unavailable include using a voltage loop with the detected back EMF voltage generated by the VCM as the feedback. The voltage across the voice coil comprises a component due to the inductance L of the VCM, a component due to the resistance R of the VCM, and a component due to the velocity of the VCM referred to as the back EMF voltage. Therefore, it is desirable to subtract the resistance and inductance voltages from the measured VCM voltage in order to improve the accuracy of the detected back EMF voltage and corresponding velocity estimate.

DETAILED DESCRIPTION OF EMBODIMENTS OF THE INVENTION

Figure 1A:
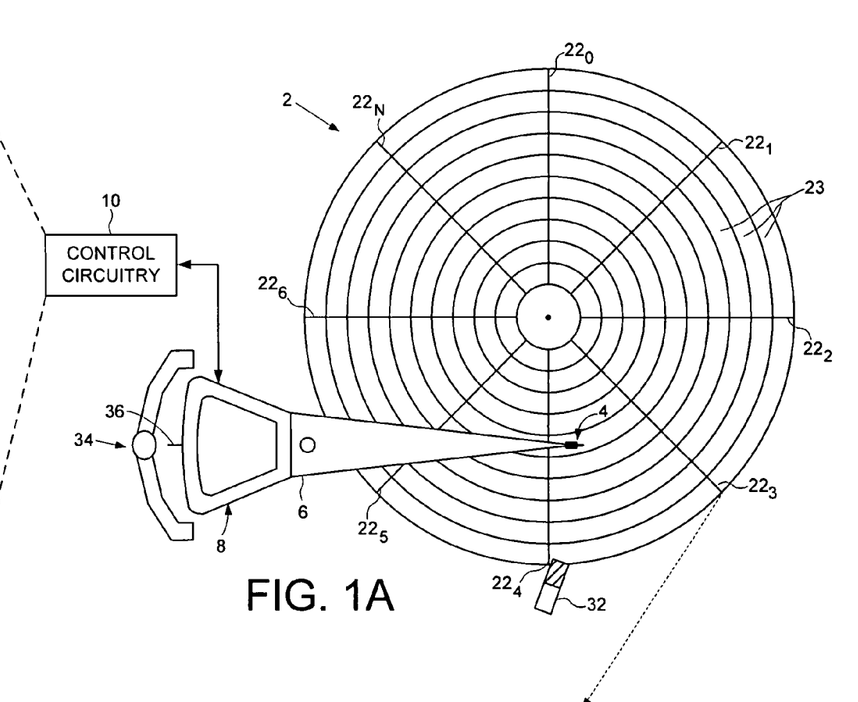
FIG. 1A shows a disk drive according to an embodiment of the present invention comprising a disk, an actuator arm, a head connected to a distal end of the actuator arm, and a voice coil motor (VCM).
Figure 1B:
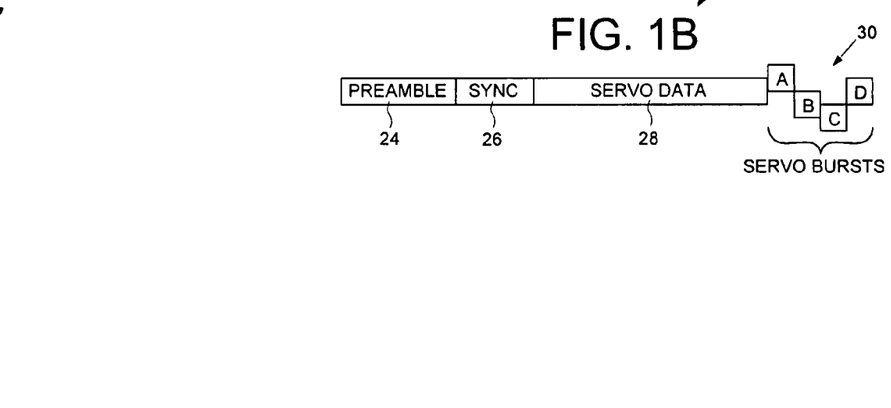
FIG. 1B shows the format of an example servo sector for servoing the head over the disk.
Figure 1C:
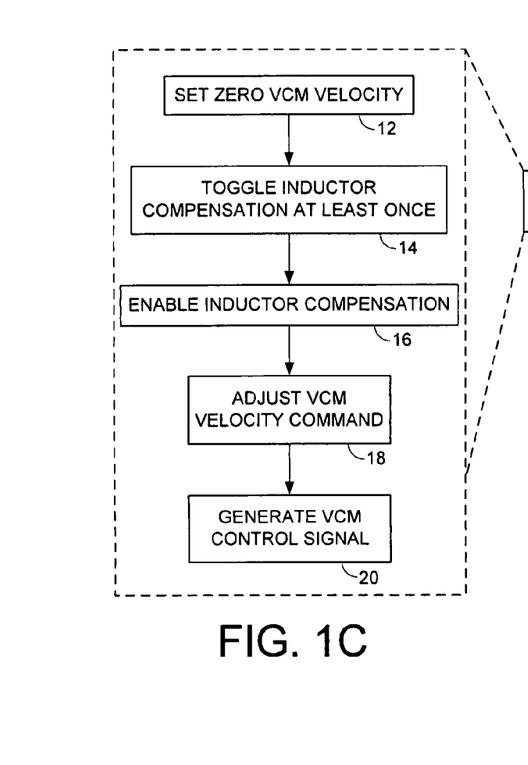
FIG. 1C is a flow diagram according to an embodiment of the present invention wherein an inductor compensation circuit is toggled at least once before it is fully enabled.

FIG. 1A shows a disk drive according to an embodiment of the present invention comprising a disk 2, a head 4 coupled to a distal end of an actuator arm 6, and a voice coil motor (VCM) operable to rotate the actuator arm 6 about a pivot to actuate the head 4 radially over the disk 2. The VCM comprises a voice coil 8 coupled to a base of the actuator arm 6 and at least one permanent magnet (not shown). The disk drive further comprises control circuitry 10 comprising an inductor compensation circuit operable to generate an estimated inductance voltage of the voice coil 8. FIG. 1C shows a flow diagram executed by the control circuitry 10 wherein a velocity command of the VCM is set to substantially zero (step 12). The inductor compensation circuit is toggled at least once by enabling and disabling the inductor compensation circuit (step 14). The inductor compensation circuit is enabled (step 16), and the velocity command of the VCM is adjusted (step 18). A control signal is generated and applied to the voice coil 8 in order to move the actuator arm (step 20), wherein the control signal is generated in response to the adjusted velocity command, the voice coil voltage, and the estimated inductance voltage.

In the embodiment of FIG. 1A, the disk 2 comprises a plurality of embedded servo sectors $22_0$-$22_N$ that define a plurality of concentric data tracks 23, wherein each servo sector comprises a preamble 24 for storing a periodic pattern, which allows proper gain adjustment and timing synchronization of the read signal, and a sync mark 26 for storing a special pattern used to symbol synchronize to a servo data field 28. The servo data field 28 stores coarse head positioning information, such as a track address, used to position the head over a target data track during a seek operation. Each servo sector 22, further comprises groups of servo bursts 30 (e.g., A, B, C and D bursts), which comprise a number of consecutive transitions recorded at precise intervals and offsets with respect to a data track centerline. The groups of servo bursts 30 provide fine head position information used for centerline tracking while accessing a data track during write/read operations. Also in the embodiment of FIG. 1A, the actuator arm 6 is parked on a ramp 32 while the disk drive is powered down or idle. In one embodiment, prior to loading the actuator arm 6 onto the disk 2, the actuator arm 6 is pressed against a crash stop 34 (rotated until a tang 36 contacts the crash stop 34) in order to calibrate a resistance of the voice coil 8.

Figure 2A:
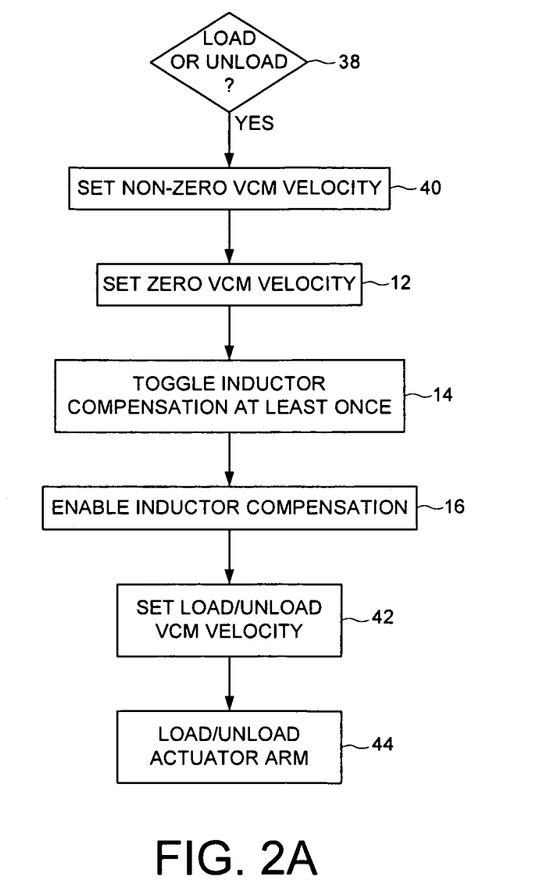
FIG. 2A shows a flow diagram according to an embodiment of the present invention wherein the inductor compensation circuit is toggled prior to one of a load or unload operation.

FIG. 2A is a flow diagram according to an embodiment of the present invention wherein during a load or unload operation (step 38) the VCM velocity command is set to a non-zero value (step 40) in order to charge the voice coil 8 with current.

The VCM velocity command is set to zero (step 12) and the inductor compensation circuit is toggled at least once (step 14) in order to precharge the inductor compensation circuit without generating an acoustic current spike. Thereafter the inductor compensation circuit is enabled (step 16), the VCM velocity command is set to a value for loading or unloading the actuator arm 6 (step 42), and the actuator arm is loaded or unloaded (step 44).

Figure 2B:
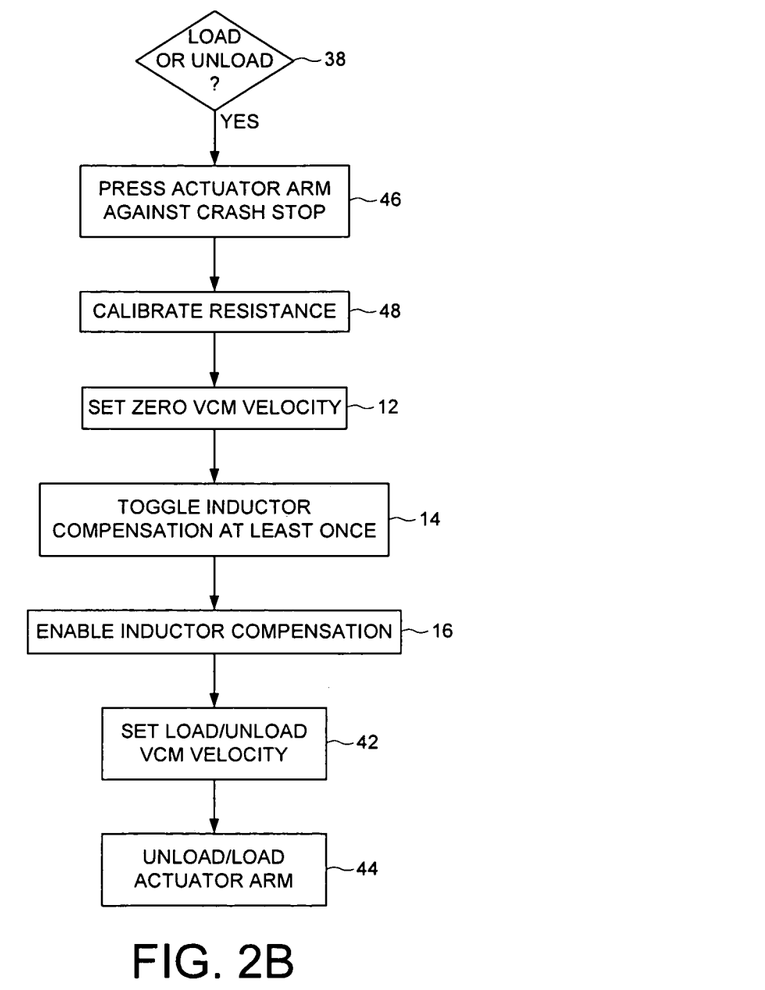
FIG. 2B shows a flow diagram according to an embodiment of the present invention wherein the actuator arm is pressed against a crash stop to calibrate an estimated voice coil resistance.

FIG. 2B is a flow diagram according to an embodiment of the present invention wherein prior to performing a load or unload operation, a resistance of the voice coil 8 is calibrated so that a resistance voltage can be estimated and used in generating the VCM control signal. In the embodiment of FIG. 2B, the actuator arm 6 is pressed against a crash stop (step 46) and the resistance calibrated (step 48) by measuring the voice coil voltage and the voice coil current. When the actuator arm 8 is pressed against a crash stop, the velocity of the voice coil 8 is zero so that the main component of the voice coil voltage is due to the voice coil resistance. After the voice coil resistance has been calibrated, it is used in generating the VCM control signal to load/unload the actuator arm by subtracting the estimated resistance voltage from the measured voice coil voltage.

In the embodiment of FIG. 2B, after the voice coil resistance is calibrated, the VCM velocity command is set to zero (step 12) and the inductor compensation circuit is toggled (step 14). In this manner, the inductor compensation circuit is precharged at a rate which helps minimize acoustic noise. When the inductor compensation circuit is fully enabled (step 16), it will have been pre-charged with current which reduces the current spike and acoustic noise that would otherwise occur.

Figure 2C:
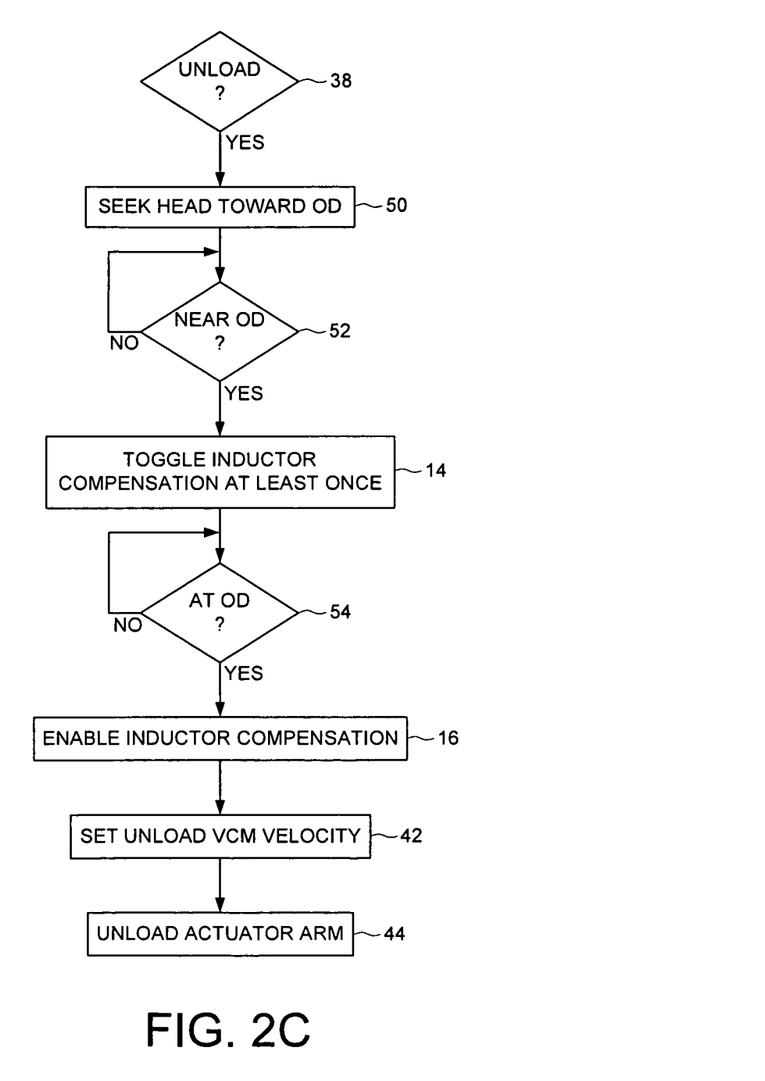
FIG. 2C shows a flow diagram according to an embodiment of the present invention wherein the inductor compensation circuit is toggled at the end of a seek operation prior to unloading the actuator arm.

FIG. 2C is a flow diagram according to another embodiment of the present invention wherein during an unload operation (step 38), the control circuitry 10 first seeks the head 4 toward an outer diameter of the disk 2 in response to the embedded servo sectors $22_0$-$22_N$ (step 50). When the head 4 nears an outer diameter track near the end of the seek operation (step 52), the inductor compensation circuit is toggled (step 14) in order to precharge the inductor compensation circuit. When the head 4 reaches the target outer diameter track at the end of the seek operation (step 54) the inductor compensation circuit is fully enabled (step 16), the VCM velocity command is set to unload the actuator arm 6 (step 42), and the actuator arm 6 is unloaded in response to the VCM control signal (step 44).

In one embodiment, prior to performing an unload operation the control circuitry 10 presses the actuator arm 6 against an inner diameter crash stop in order to calibrate the voice coil resistance, and then moves the head 4 toward the outer diameter of the disk 2, for example, by seeking the head 4 in response to the embedded servo sectors $22_0$-$22_N$, or by moving the head 4 open loop in a velocity control mode described below. Prior to moving the head 4 in the velocity control mode, the control circuitry 10 toggles the inductor compensation circuit after pressing the actuator arm 6 against the inner diameter crash stop. In another embodiment, the control circuitry 10 estimates the voice coil resistance as a function of an estimated voice coil temperature, thereby avoiding the step of pressing the actuator arm 6 against the inner diameter crash stop so that instead the control circuitry 10 can immediately move the head 4 to the outer diameter of the disk 2.

Figure 3:
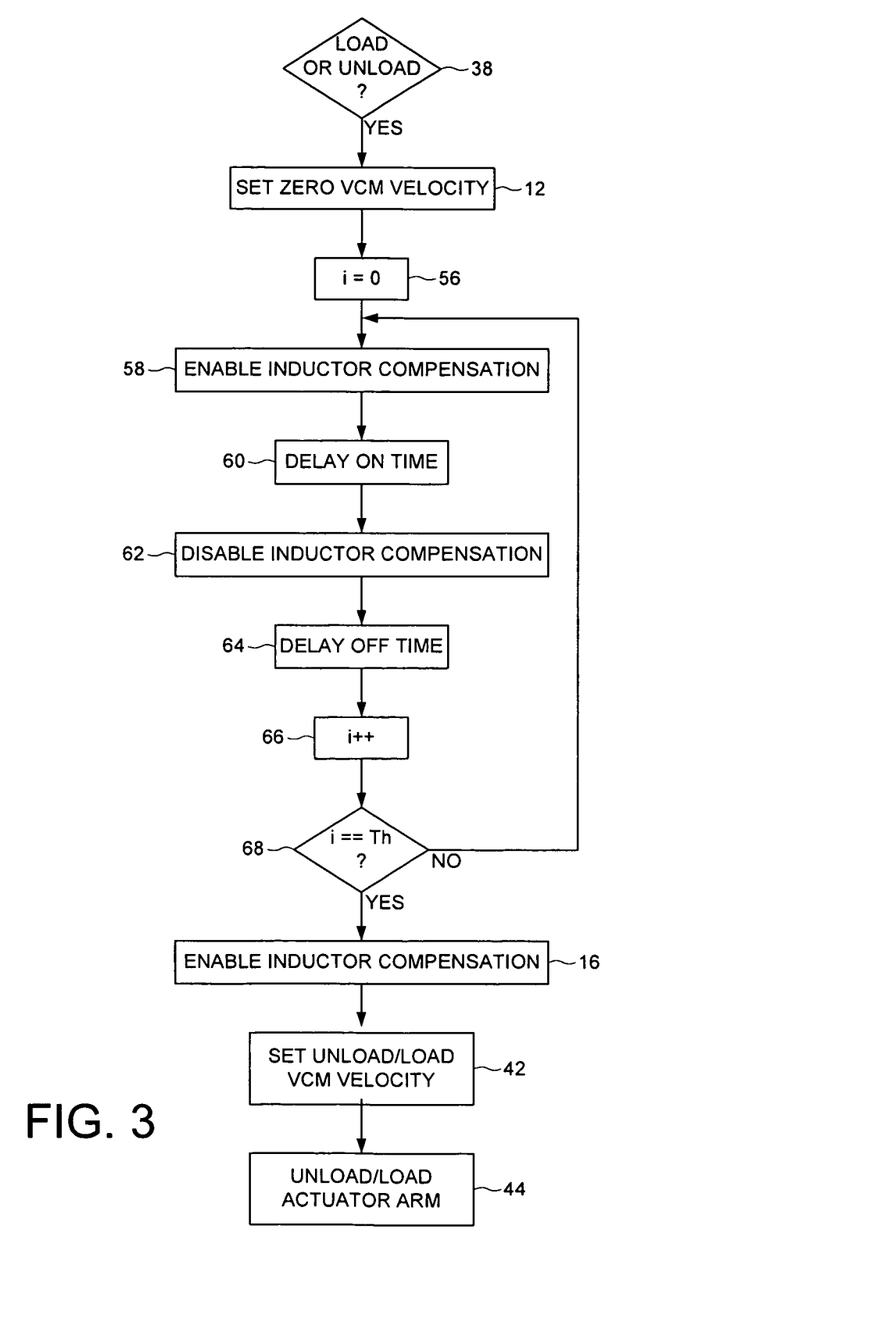
FIG. 3 shows a flow diagram according to an embodiment of the present invention wherein the inductor compensation circuit is toggled for an on-time and then an off-time at least once.

FIG. 3 is a flow diagram according to an embodiment of the present invention for loading/unloading the actuator arm 6 (step 38). After setting the VCM velocity command to zero (step 12), a counter i is initialized to zero (step 56). The inductor compensation circuit is then enabled (step 58) for an on-time (step 60), and then disabled (step 62) for an off-time (step 64). The counter i is incremented (step 66) and the process is repeated until the counter i equals a threshold (step 68). In this manner, the inductor compensation circuit is toggled a number of cycles, wherein each cycle comprises an on-time and an off-time.

Figure 4A:
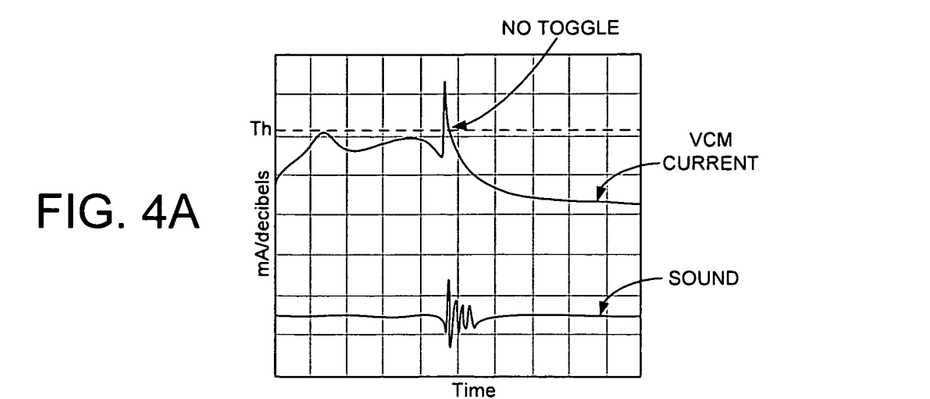
FIG. 4A illustrates an example spike in the VCM current that causes acoustic noise when the inductor compensation circuit is not toggled.
Figure 4B:
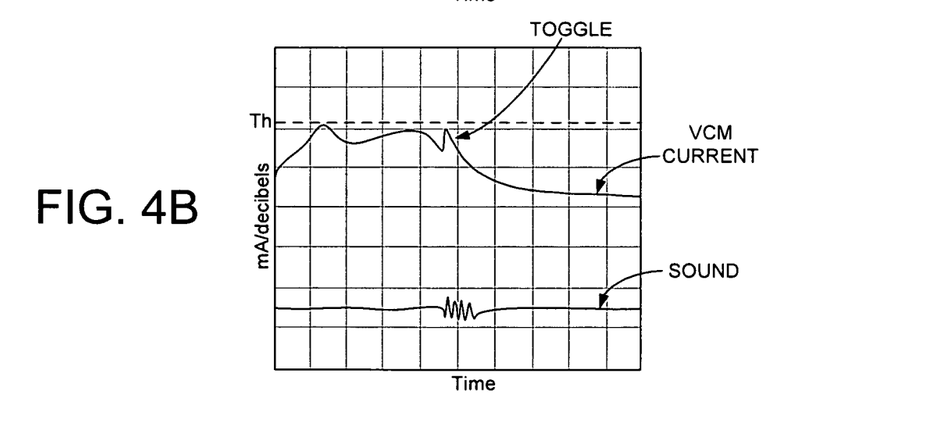
FIG. 4B illustrates an example of how the spike in the VCM current may be reduced by toggling the inductor compensation circuit.

FIG. 4A illustrates an example spike in the VCM current that causes acoustic noise when the inductor compensation circuit is not toggled. In the embodiment of FIG. 4A, the inductor compensation circuit is fully enabled after pressing the actuator arm 6 against the crash stop. When the VCM velocity command is set to zero and the inductor compensation circuit fully enabled, the rapid initialization of the inductor compensation circuit causes the loop to create a current spike and associated acoustic noise as illustrated in FIG. 4A. FIG. 4B illustrates an example of the reduction in the current spike and associated acoustic noise when the inductor compensation circuit is toggled according to an embodiment of the present invention.

Figure 4C:
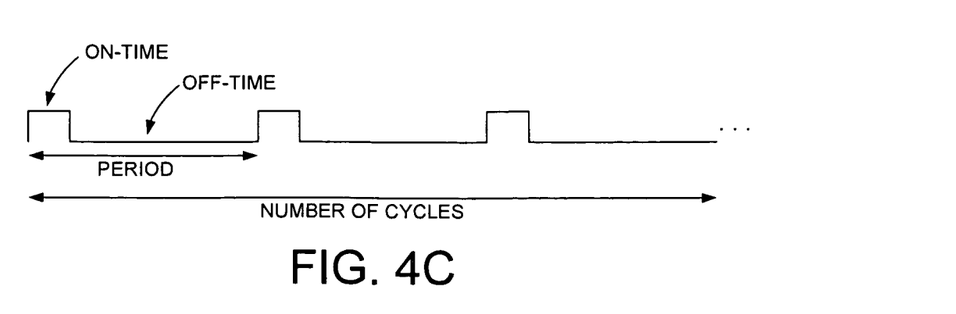
FIG. 4C shows an embodiment of the present invention wherein at least one of an on-time, off-time, and number of cycles is adjusted to tune the toggling of the inductor compensation circuit.

FIG. 4C illustrates an embodiment of the present invention wherein toggling the inductor compensation circuit comprises enabling the inductor compensation circuit for an on-time, and disabling the inductor compensation circuit for an off-time, wherein the on/off periods are repeated for a number of cycles. In one embodiment, at least one of the parameters shown in FIG. 4C are adjusted in order to calibrate the toggle operation. For example, in one embodiment at least one of the parameters of FIG. 4C is adjusted until the voice coil current remains below a threshold Th as illustrated in FIGS. 4A and 4B. In one embodiment, the toggle parameters may be calibrated once for a family of disk drives, and in another embodiment, the toggle parameters may be calibrated for each individual disk drive. In one embodiment, the toggle parameters may be calibrated during a manufacturing process of the disk drive, and in another embodiment, the toggle parameters are calibrated while the disk drive is deployed in the field.

Figure 5:
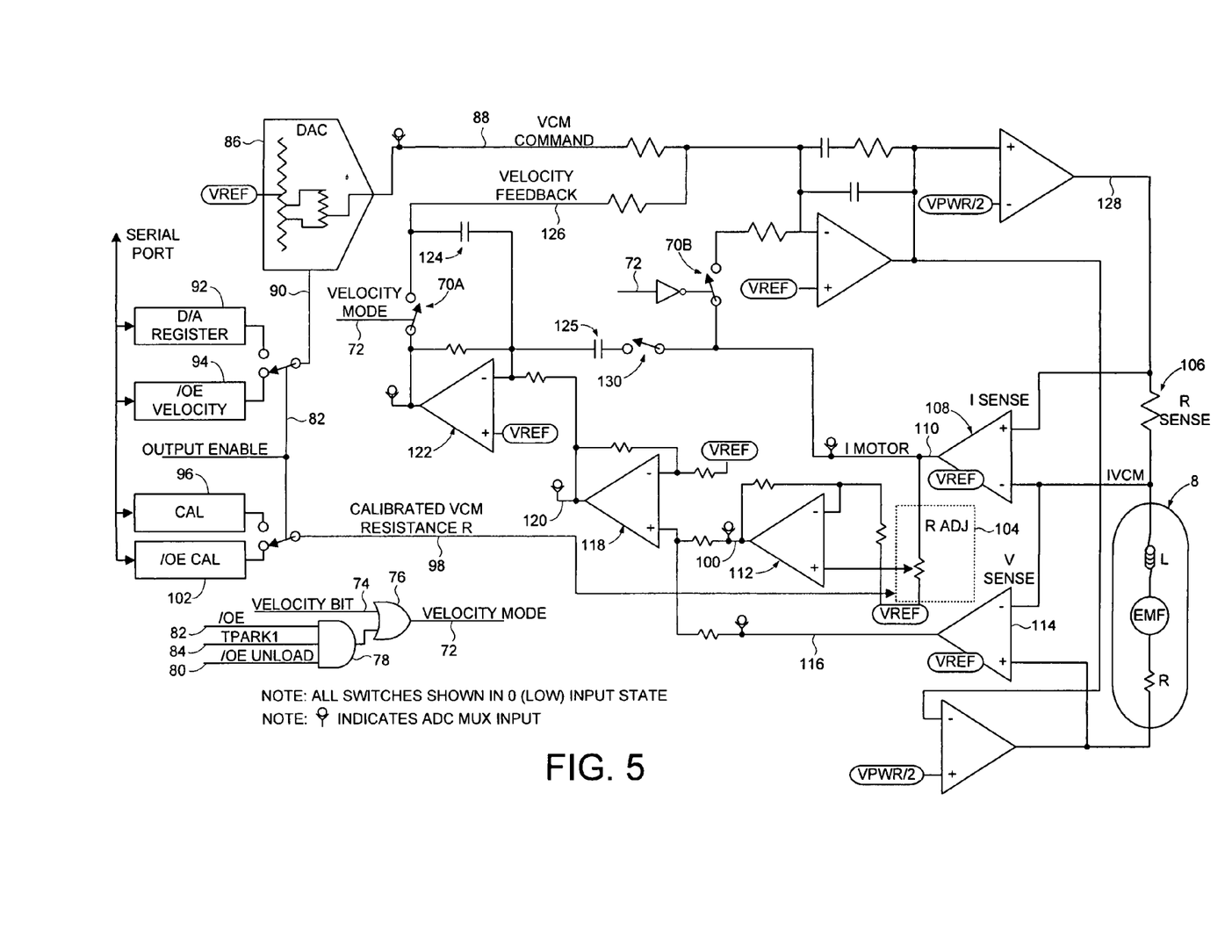
FIG. 5 shows control circuitry according to an embodiment of the present invention wherein the inductor compensation circuit comprises a capacitor.

FIG. 5 shows example control circuitry 10 according to an embodiment of the present invention which operates in a normal operating mode wherein the voice coil 8 is driven by a current controlled feedback loop (e.g., when controlling the VCM in response to the embedded servo sectors $22_0$-$22_N$), and in a velocity control mode wherein the voice coil 8 is driven by a voltage controlled feedback loop (e.g., when loading or unloading the actuator arm 6). When in the normal operating mode, switch 70A is opened and switch 70B is closed to configure the current feedback loop, and when in the velocity control mode, switch 70A is closed and switch 70B is opened to configure the voltage feedback loop. A velocity mode control signal 72 configures the switches 70A and 70B for velocity control mode when the embedded servo sectors are not used to servo the VCM.

A velocity bit 74 is set by the control circuitry 10 to activate the velocity mode control signal 72 via OR gate 76. The velocity bit 74 may be set during controlled modes of operation, such as during a powered load/unload operation, or when synchronization to the embedded servo data is lost. The velocity mode control signal 72 may also be activated via AND gate 78 and OR gate 76 during emergency unloads, such as during power down or power failure. If the OE UNLOAD signal 80 has been preset to configure the drive for velocity mode unload, when a power down or power failure is detected, the control signals OUTPUT ENABLE (OE) 82 and TPARK1 84 are automatically activated, thereby activating the velocity mode control signal 72.

A digital-to-analog converter (DAC) 86 generates an analog VCM command signal 88 in response to a digital command input signal 90. A digital register 92 is programmed with an operating command input during normal operation (including a powered load/unload), and a digital register 94 is programmed with a velocity mode command input used during emergency unloads, such as during power down or power failure. A digital register 96 stores a calibrated voice coil resistance R value 98 for use during velocity control mode when the velocity bit 74 is activated (e.g., when calibrating a detected IR voltage 100). After calibrating the detected IR voltage 100, a digital register 102 stores the calibrated voice coil resistance R value 98 for use during powered unloads, as well as emergency unloads during power down or power failure. The calibrated voice coil resistance R value 98 is used to program a variable resistor 104 in order to calibrate the detected IR voltage 100. For more information on calibrating the IR voltage 100, see U.S. Pat. No. 6,690,536 "DISK DRIVE EMPLOYING VCM DEMAND CURRENT TO CALIBRATE VCM IR VOLTAGE FOR VELOCITY CONTROL OF AN ACTUATOR ARM" and U.S. Pat. No. 6,795,268 "DISK DRIVE EMPLOYING SEEK TIME VCM IR VOLTAGE CALIBRATION FOR VELOCITY CONTROL OF AN ACTUATOR ARM" the disclosures of which are incorporated herein by reference.

A sense resistor 106 and amplifier 108 implement a suitable current detector for generating a voltage representing the current 110 flowing through the voice coil 8. With the voltage representing the current 110 applied to the variable resistor 104, the output of amplifier 112 is the calibrated IR voltage 100. An amplifier 114 measures the voltage 116 across the voice coil 8. The IR voltage 100 is subtracted from the voice coil voltage 116 and amplified at amplifier 118, the output 120 of which is filtered by amplifier 122 and capacitor 124 and summed with the feedback current 110 through capacitor 125 in order to subtract the voice coil inductance voltage, thereby generating a velocity feedback voltage 126 representing the velocity of the VCM (the BEMF voltage). The velocity feedback voltage 126 is subtracted from the VCM command signal 88 to generate the control signal 128 applied to the voice coil 8.

In the embodiment of FIG. 5, the inductor compensation circuit is toggled (step 14 of FIG. 1C) by toggling switch 130. That is, switch 130 is turned on for an on-time and turned off for an off-time for at least one cycle, and in one embodiment over multiple cycles as shown in FIG. 4C. The inductor compensation circuit is then fully enabled (step 16 of FIG. 1C) by turning switch 130 on and keeping switch 130 on during the velocity mode operation (e.g., during a load or unload operation).

In one embodiment, during a powered unload operation, the control circuitry 10 seeks the head 4 to an outer diameter track (e.g., near the bottom of the ramp 32) by programming register 92 with appropriate command values in response to the embedded servo sectors $22_0$-$22_N$. For example, the command value may be generated as a velocity error relative to the radial position of the head 4 (i.e., relative to a seek profile). In one embodiment, the seek operation to the outer diameter track terminates with the velocity of the head 4 approximately zero after settling onto the target track (after toggling the inductor compensation circuit). Thereafter the control circuitry 10 enables the inductor compensation circuit and asserts the velocity bit 74 to configure the circuitry of FIG. 5 into the velocity mode, and then programs register 92 with ramped command values so that the actuator arm 6 contacts the ramp 32 at a low velocity and then increases velocity as the actuator arm 6 travels up and along the ramp 32.

Figure 6:
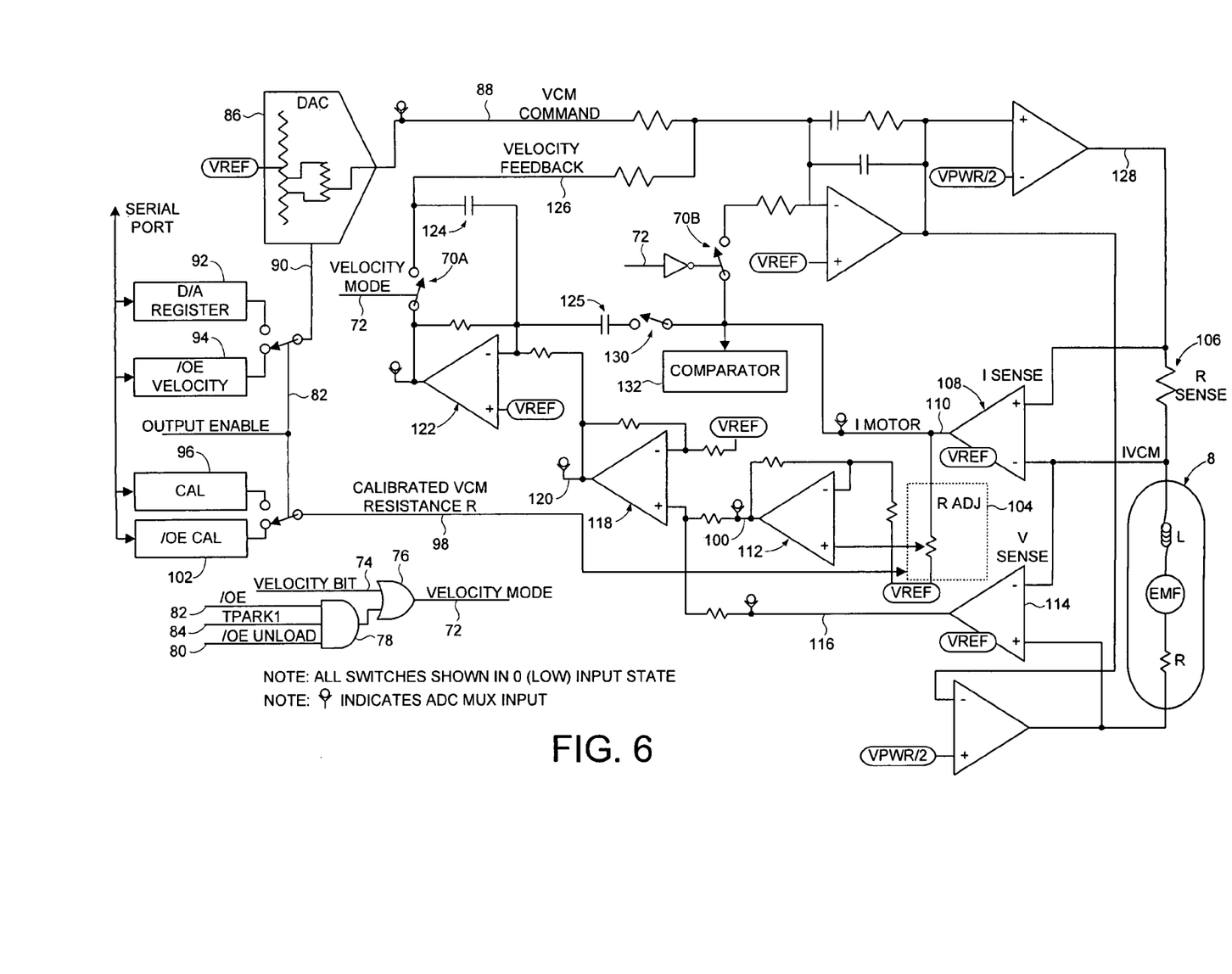
FIG. 6 shows control circuitry according to an embodiment of the present invention including a comparator for calibrating the toggling of the inductor compensation circuit.

FIG. 6 shows control circuitry 10 according to an embodiment of the present invention including a comparator 132 which compares the estimated current 110 flowing through the voice coil 8 to a threshold Th in order to calibrate the toggle parameters (e.g., on-time, off-time, and/or number of cycles). In one embodiment, the toggle parameters are calibrated by performing multiple velocity mode operations (e.g., multiple loads and/or unloads) and adjusting the toggle parameters prior to each operation until the peak current falls below the threshold in comparator 132. In another embodiment, one or more of the toggling parameters are adjusted in real time in response to the voice coil current. For example, the on-time of multiple toggle cycles may be decreased until the voice coil current falls below the threshold at comparator 132.

The inductor compensation circuit may be used during any suitable velocity mode operation in addition to, or instead of a load or unload operation, such as when the control circuitry 10 loses synchronization to the embedded servo sectors $22_0$-$22_N$. In addition, the inductor compensation circuit may comprise any suitable circuitry other than the circuitry shown in FIG. 5.

Any suitable control circuitry may also be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head coupled to a distal end of an actuator arm;
   a voice coil motor (VCM) operable to rotate the actuator arm about a pivot to actuate the head radially over the disk, the VCM comprising a voice coil; and
   control circuitry comprising an inductor compensation circuit operable to generate an estimated inductance voltage of the voice coil, the control circuitry operable to:
   measure a voice coil voltage across the voice coil;
   set a velocity command of the VCM to substantially zero;
   toggle the inductor compensation circuit at least once by enabling and disabling the inductor compensation circuit;
   enable the inductor compensation circuit;
   adjust the velocity command of the VCM; and
   during a velocity mode generate a control signal applied to the voice coil in order to move the actuator arm without toggling the inductor compensation circuit, wherein the control signal is generated in response to the adjusted velocity command, the voice coil voltage, and the estimated inductance voltage.

2. The disk drive as recited in claim 1, wherein the control circuitry is further operable to subtract the estimated inductance voltage from the voice coil voltage.

3. The disk drive as recited in claim 1, further comprising a resistance compensation circuit for generating an estimated resistance voltage of the voice coil, wherein the control circuitry is further operable to generate the control voltage applied to the voice coil in response to the estimated resistance voltage.

4. The disk drive as recited in claim 1, wherein the control circuitry is further operable to adjust the velocity command to perform at least one of a load and unload operations.

5. The disk drive as recited in claim 1, wherein the control circuitry is further operable to set the velocity command to a non-zero value in order to charge the voice coil prior to toggling the inductor compensation circuit.

6. The disk drive as recited in claim 5, wherein the control circuitry is further operable to set the velocity command to the non-zero value in order to press the actuator arm against a crash stop.

7. The disk drive as recited in claim 5, wherein the control circuitry is further operable to set the velocity command to the non-zero value in order to seek the head toward the outer diameter of the disk.

8. The disk drive as recited in claim 7, wherein the control circuitry is further operable to toggle the inductor compensation circuit near the end of the seek operation.

9. The disk drive as recited in claim 1, wherein toggling the inductor compensation circuit comprises enabling the inductor compensation circuit for an on-time, and disabling the inductor compensation circuit for an off-time.

10. The disk drive as recited in claim 9, wherein the inductor compensation circuit is toggled at least twice.

11. The disk drive as recited in claim 9, wherein the control circuitry is further operable to:
    detect a current flowing through the voice coil to generate a detected voice coil current; and
    adjust at least one of the on-time, off-time, and a number of toggle cycles in response to the detected voice coil current.

12. The disk drive as recited in claim 11, wherein the control circuitry is further operable to:
    compare the detected voice coil current to a threshold while toggling the inductor compensation circuit; and
    adjust at least one of the on-time, off-time, and the number of toggle cycles in response to the comparison.

13. The disk drive as recited in claim 1, wherein:
    the control circuitry is further operable to detect a current flowing through the voice coil;
    the inductor compensation circuit comprises a capacitor; and
    toggling the inductor compensation circuit comprises connecting and disconnecting the capacitor from the detected voice coil current.

14. A method of operating a disk drive, the disk drive comprising a disk, a head coupled to a distal end of an actuator arm, and a voice coil motor (VCM) operable to rotate the actuator arm about a pivot to actuate the head radially over the disk, the VCM comprising a voice coil, the method comprising:
    measuring a voice coil voltage across the voice coil;
    generating an estimated inductance voltage of the voice coil using an inductor compensation circuit;
    setting a velocity command of the VCM to substantially zero;
    toggling the inductor compensation circuit at least once by enabling and disabling the inductor compensation circuit;
    enabling the inductor compensation circuit;
    adjusting the velocity command of the VCM; and
    during a velocity mode generating a control signal applied to the voice coil in order to move the actuator arm without toggling the inductor compensation circuit, wherein the control signal is generated in response to the adjusted velocity command, the voice coil voltage, and the estimated inductance voltage.

15. The method as recited in claim 14, further comprising subtracting the estimated inductance voltage from the voice coil voltage.

16. The method as recited in claim 14, further comprising adjusting the velocity command to perform at least one of a load and unload operations.

17. The method as recited in claim 14, further comprising setting the velocity command to a non-zero value in order to charge the voice coil prior to toggling the inductor compensation circuit.

18. The method as recited in claim 17, further comprising setting the velocity command to the non-zero value in order to press the actuator arm against a crash stop.

19. The method as recited in claim 17, further comprising setting the velocity command to the non-zero value in order to seek the head toward the outer diameter of the disk.

20. The method as recited in claim 19, further comprising toggling the inductor compensation circuit near the end of the seek operation.

21. The method as recited in claim 14, wherein toggling the inductor compensation circuit comprises enabling the inductor compensation circuit for an on-time, and disabling the inductor compensation circuit for an off-time.

22. The method as recited in claim 21, wherein the inductor compensation circuit is toggled at least twice.

23. The method as recited in claim 21, further comprising:
    detecting a current flowing through the voice coil to generate a detected voice coil current; and
    adjusting at least one of the on-time, off-time, and a number of toggle cycles in response to the detected voice coil current.

24. The method as recited in claim 23, further comprising:
    comparing the detected voice coil current to a threshold while toggling the inductor compensation circuit; and
    adjusting at least one of the on-time, off-time, and the number of toggle cycles in response to the comparison.

25. The method as recited in claim 14, further comprising:
    detecting a current flowing through the voice coil; and
    toggling the inductor compensation circuit by connecting and disconnecting a capacitor from the detected voice coil current.

* * * * *